Patented Sept. 18, 1951

2,568,313

UNITED STATES PATENT OFFICE 2,568,313

MANUFACTURE OF RESINS FROM ALDEHYDES AND AROMATIC HYDROCARBONS

Thomas Geoffrey Woolhouse, Saltburn-by-the-Sea, and William Lunn, Redcar, England No Drawing. Application December 9, 1948, Serial No. 64,442. In Great Britain December 16, 1947

3 Claims. (Cl. 260—67)

This invention relates to the manufacture of resins by reacting aldehydes with aromatic hydrocarbons in the presence of a strong acid, for example, sulphuric acid, the expression "strong acid" being used in the sense of an acid having a high affinity for bases.

An object of the present invention is to break the said emulsion by an improved method which does not require prolonged heating at elevated temperatures.

Another object of the invention is to provide an improved separation of acid from the reaction product.

A further object of the invention is to provide improved conditions for neutralisation of the residual acid in the reaction product.

According to the present invention an improvement of the extraction and separation processes in cases where an emulsion is formed in the said extraction process consists in facilitating the separation into an acid phase and a solvent phase by means of an emulsion-breaking wetting agent which has surface activity in the presence of the acid used, which said acid may be, for example, sulphuric acid of a concentration up to 60 per cent, the said agent being added in a proportion to break the emulsion. The wetting agent may be added to the product of the reaction of the aldehyde and the hydrocarbon before agitation with the organic solvent, or during or after the agitation. In the latter case the mixture may be further agitated in order to ensure that the wetting agent is effective and to complete the separation of the components.

Examples of wetting agents suitable for use in the present invention, that is to say which have an emulsion-breaking effect in the presence of sulphuric acid of the strength referred to, are sodium salts of higher alkyl sulphates such as, for instance, sodium lauryl sulphate, or the composition known by the trade name Teepol, which is believed to be an aqueous solution containing 21–22 per cent. of a compound having the formula

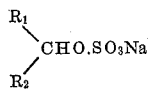

wherein $R_1$ and $R_2$ stand for higher alkyl radicals. There may also be used sodium salts of alkyl-aryl sulphonates, for example, that known by the trade name Nansa Powder. It is to be understood, however, that the invention is not limited to the use of the said wetting agents but that any wetting agent having the specified properties is suitable for the purpose.

The quantity of the wetting agent which is added is that which is sufficient to facilitate the separation. The action of the agent appears to be partially to reverse the emulsion, and the addition of too great a quantity may in some cases reverse the emulsion almost completely. The composition referred to above and known by the trade name Teepol, for example, may be used in amounts up to 10 per cent. of the resin product. The correct quantity of any other suitable wetting agent can easily be found as the result of a simple test.

Suitable aromatic hydrocarbons are, for example, benzene, alkyl benzenes, such as xylene, naphthalene, acenaphthene, alkyl naphthalenes, and polynuclear hydrocarbons such as phenanthrene or anthracene, or mixtures of such hydrocarbons. It is important that the hydrocarbon be practically free from phenols, bases, and unsaturated compounds such as styrene and indene or their derivatives, since the presence of appreciable amounts of such compounds may initiate a violent uncontrollable reaction or may produce a black intractable resinous product.

As aldehydes there may be mentioned, for example, formaldehyde and benzaldehyde. Suitable organic solvents are for example, toluene and xylene.

An advantageous procedure is as follows:

The reaction is carried out in a steam-jacketed lead-lined reactor fitted with a cone bottom, stirrer, thermometer and water-cooled condenser. A thermometer is also placed in the steam jacket. The hydrocarbon, formaldehyde and sulphuric acid in the required proportions are charged into the reactor and the temperature is slowly raised to 90° C. An exothermic reaction sets in at temperatures above 90° C., which will proceed smoothly provided that the hydrocarbon has a sufficient degree of purity as indicated above. Later it is necessary to use the heating jacket in order to maintain the temperature of the reactants during a further 1–2 hours at 110–120° C. Toluene is added, with stirring, to the reacted material together with a quantity of water and the requisite amount of wetting agent. The contents are then allowed to settle and the acid liquor is separated from the bottom. Solid soda ash is then stirred into the resin solution in toluene to neutralise free acid and the mixture is filtered. The filtered solution is transferred to a still and the toluene is distilled off by means of a closed steam-heating unit and the application of open steam. The molten resin is run from the still.

The following examples illustrate the invention:

Example 1

261 grams of commercially pure xylene, 231 ml. of 40 per cent. formaldehyde and 172 ml. of B. O. V. sulphuric acid were reacted at 100–110° C. for 4 hours. The reacted mixture was then diluted with 290 ml. of toluol and 50 ml. of water and transferred to a separator. The mixture separated into two layers, the bottom layer being a thick emulsion of acid in resin solution. Agitation with 4 ml. of the composition referred to above and known by the trade name Teepol caused the mixture to separate into a clear fluid acid layer beneath a solution of resin. The acid layer was easily run from the resin solution which was then neutralised with solid sodium carbonate. Resin was recovered from the filtered solution by distilling off the solvent. The resin had a melting point of 45° C. R. & B. and colour 3 on the Barrett scale.

Example 2

275 grams of a coal tar heavy naphtha of boiling range 160–210° C. and substantially free from unsaturated compounds were reacted with 182 ml. of 40 per cent. formaldehyde and 112 ml. B. O. V. sulphuric acid for 4 hours at 100–110° C. 250 ml. of toluol were added and the mixture was transferred to a separator. The thick acid emulsion which appeared as the bottom layer was broken by stirring with 9 ml. of the composition referred to above and known by the trade name Teepol and the mixture separated into resin solution and clear acid. The acid was removed and the resin solution neutralised with solid sodium carbonate. After filtration, the solvent was removed by distillation. A resin of melting point 55.5° C. R. & B. and colour 3 Barrett was obtained.

Example 3

240 grams of naphthalene of melting point 79.15° C., 160 ml. of 40 per cent. formaldehyde and 120 ml. of B. O. V. sulphuric acid were reacted at 100–115° C. for 4 hours. The mixture was diluted with 400 ml. of toluol and 100 ml. of water. On standing, a lower layer consisting of a thick and viscous sludge was formed. Addition of 6 ml. of the composition referred to above and known by the trade name Teepol caused a complete separation into clear acid and resin solution. To recover the resin, the solution was neutralised with solid sodium carbonate, filtered, and distilled.

We claim:

1. A process for the manufacture of resins which comprises reacting an aldehyde in the presence of an acid with an aromatic hydrocarbon having no non-benzoid unsaturation, extracting the reaction product from the reaction mixture with an organic solvent immiscible with water in the presence of an emulsion-breaking wetting agent which has surface activity in the presence of the acid used, the said agent being added in a proportion to break an emulsion liable to be formed in the extraction, separating the solution of the reaction product in the organic solvent from the acid phase, neutralising the said solution with a solid substantially water-free neutralising agent, isolating the neutral solution and removing the solvent.

2. A process for the manufacture of resins which comprises reacting an aldehyde in the presence of sulphuric acid with an aromatic hydrocarbon having no non-benzoid unsaturation, extracting the reaction product with toluene in the presence of an emulsion-breaking wetting agent which has surface activity in the presence of sulphuric acid, the said agent being added in a proportion to break an emulsion liable to be formed in the extraction separating the toluene solution from the acid phase, neutralising the toluene solution with a solid substantially water-free neutralising agent, isolating the neutral solution and removing the toluene.

3. A process for the manufacture of resins which comprises reacting formaldehyde in the presence of sulphuric acid with an aromatic hydrocarbon of the group comprising benzene, alkyl benzenes and naphthalene, extracting the reaction product with toluene in the presence of an aqueous solution containing 21–22 percent of a compound having the formula

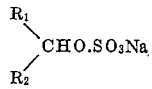

wherein $R_1$ and $R_2$ stand for higher alkyl radicals, the said aqueous solution being present in a proportion of about 10% of the said reaction product, separating the toluene solution from the acid phase, neutralising the toluene solution with solid substantially anhydrous sodium carbonate, isolating the neutral solution and removing the toluene.

THOMAS GEOFFREY WOOLHOUSE.
WILLIAM LUNN.

REFERENCES CITED

The following references are of record in the file of this patent:

UNITED STATES PATENTS

| Number | Name | Date |
|---|---|---|
| 898,307 | Bohn | Sept. 8, 1908 |
| 2,157,544 | Kline | May 9, 1939 |
| 2,372,623 | Zinner | Mar. 27, 1945 |

OTHER REFERENCES

Synthetic Organic Chemicals, 12th edition, July 1, 1945, pages 89–90.

De Groote Ohio State University Engineering Experimentation News, vol. XX, No. 1, February 1948, pages 13–20.

Snell Ind. and Eng. Chem., vol. 35, January 1943, pages 107–117.